(12) United States Patent
Finkle et al.

(10) Patent No.: US 8,097,993 B2
(45) Date of Patent: Jan. 17, 2012

(54) ELECTRIC MOTOR AND/OR GENERATOR WITH MECHANICALLY TUNEABLE PERMANENT MAGNETIC FIELD

(76) Inventors: Louis J. Finkle, Lakewood, CA (US); Andrea Furia, Downey, CA (US)

( * ) Notice: Subject to any disclaimer, the term of this patent is extended or adjusted under 35 U.S.C. 154(b) by 71 days.

(21) Appl. No.: 12/610,271

(22) Filed: Oct. 30, 2009

(65) Prior Publication Data

US 2011/0101812 A1    May 5, 2011

(51) Int. Cl.
   *H02K 21/12* (2006.01)
(52) U.S. Cl. ......... 310/156.36; 310/156.37; 310/156.43; 310/156.47
(58) Field of Classification Search .............. 310/156.24, 310/156.36, 156.38, 156.343, 156.47, 156.48, 310/191, 209, 156.43, 156.37
   See application file for complete search history.

(56) References Cited

U.S. PATENT DOCUMENTS

| | | | |
|---|---|---|---|
| 2,209,558 A | 7/1940 | Bing et al. | |
| 2,243,616 A | 5/1941 | Bing et al. | |
| 2,287,286 A | 6/1942 | Bing et al. | |
| 2,558,540 A | 6/1951 | Clos | |
| 4,151,431 A | 4/1979 | Johnson | |
| 4,482,034 A * | 11/1984 | Baermann | 188/165 |
| 4,508,998 A | 4/1985 | Hahn | |
| 5,594,289 A | 1/1997 | Minato | |
| 6,771,000 B2 * | 8/2004 | Kim et al. | 310/209 |
| 2004/0041481 A1 | 3/2004 | Kuo | |
| 2006/0038457 A1 | 2/2006 | Miyata et al. | |
| 2007/0228856 A1 | 10/2007 | Bates et al. | |

FOREIGN PATENT DOCUMENTS

| | | |
|---|---|---|
| JP | 62-117558 | 11/1988 |
| WO | WO 88/05976 | 8/1988 |

* cited by examiner

*Primary Examiner* — Quyen Leung
*Assistant Examiner* — Jose Gonzalez Quinones
(74) *Attorney, Agent, or Firm* — Kenneth L. Green

(57) ABSTRACT

Apparatus and method for tuning the magnetic field of brushless motors and alternators to obtain efficient operation over a broad RPM range. The motor or alternator includes fixed windings (or stator) around a rotating rotor carrying permanent magnets. The permanent magnets are cylindrical and have North (N) and South (S) poles formed longitudinally in the cylindrical magnets. The magnets reside in magnetic conducing pole pieces (for example, low carbon or soft steel, and/or laminated insulated layers, of non-magnetizable material). Rotating the cylindrical permanent magnets inside the pole pieces either strengthens or weakens the resulting magnetic field to adjust the motor or alternator for low RPM torque or for efficient high RPM efficiency. Varying the rotor magnetic field adjusts the voltage output of the alternators allowing, for example, a windmill generator, to maintain a fixed voltage output. Other material used in the rotor is generally non-magnetic, for example, stainless steel.

20 Claims, 15 Drawing Sheets

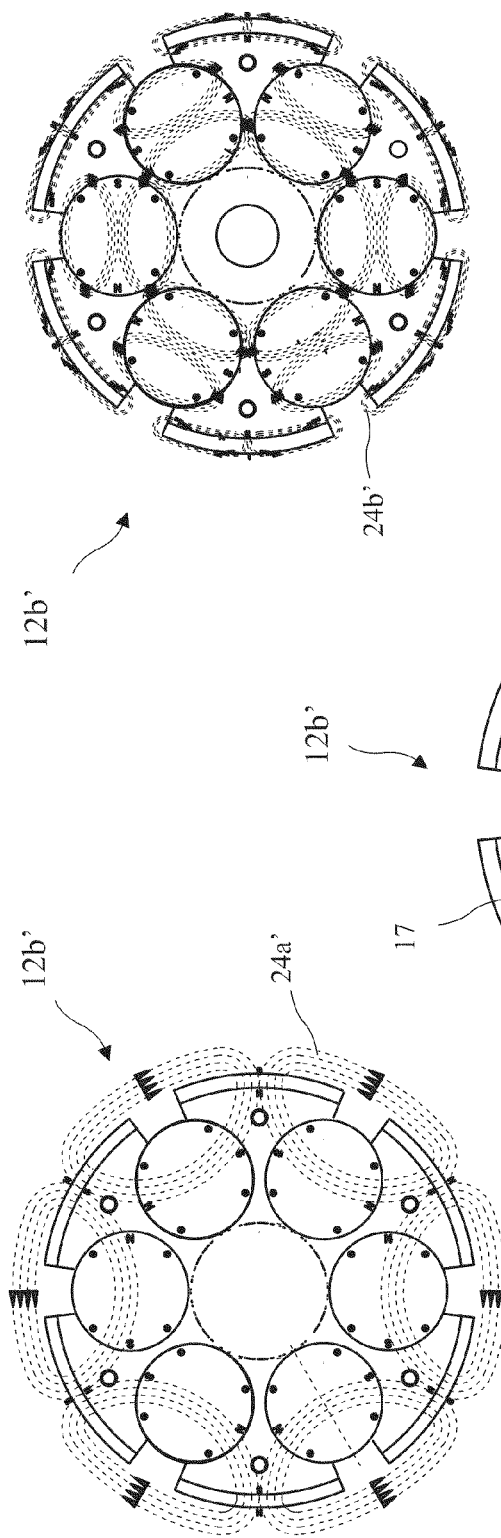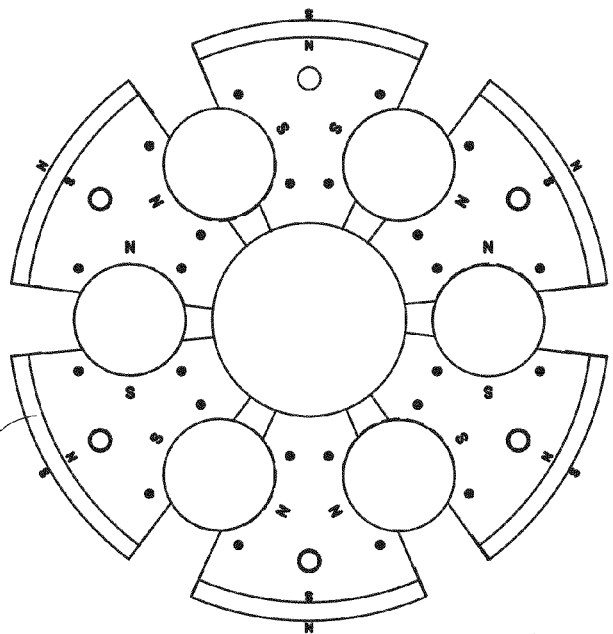
FIG. 17B
FIG. 17A
FIG. 16

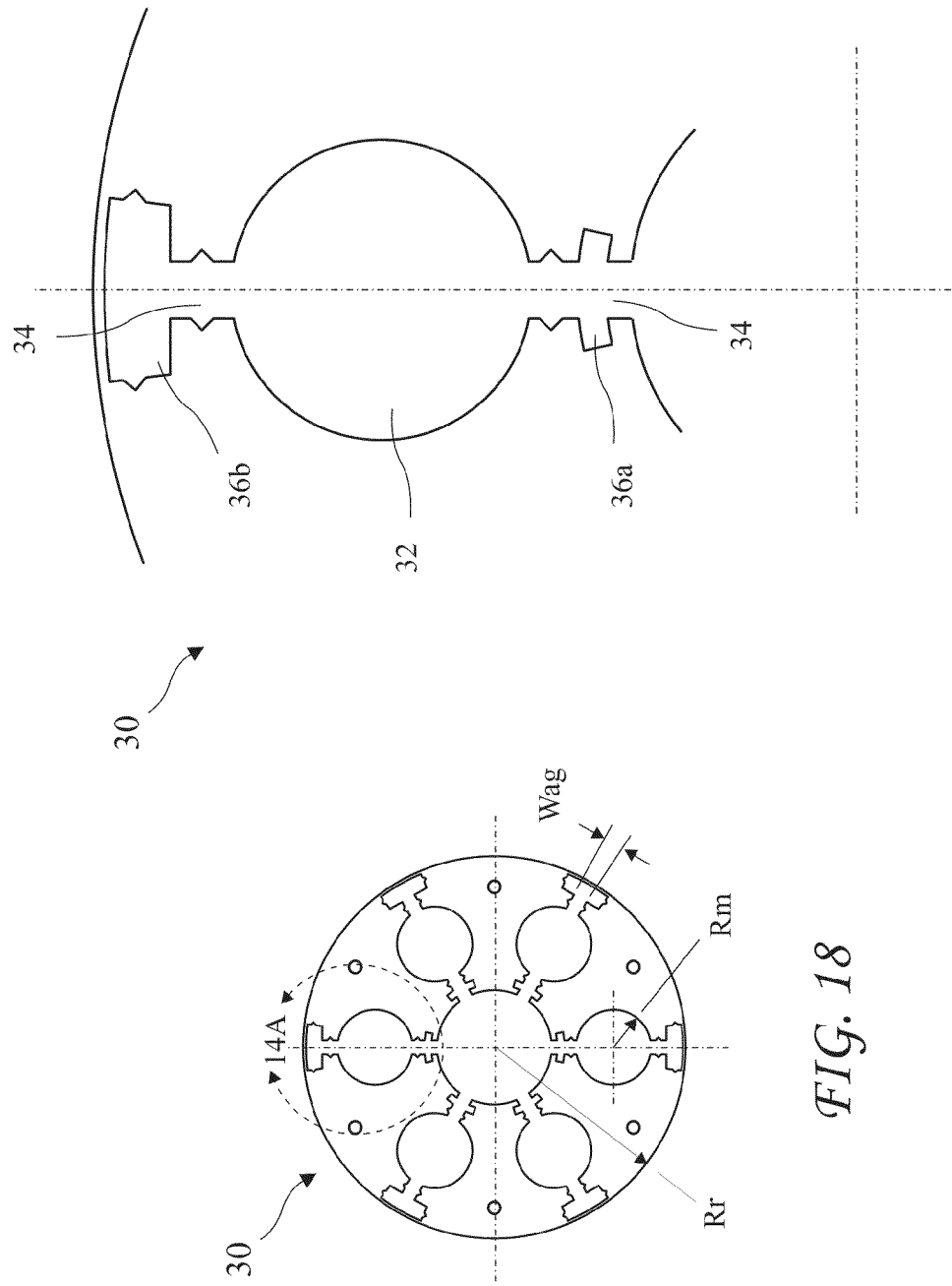

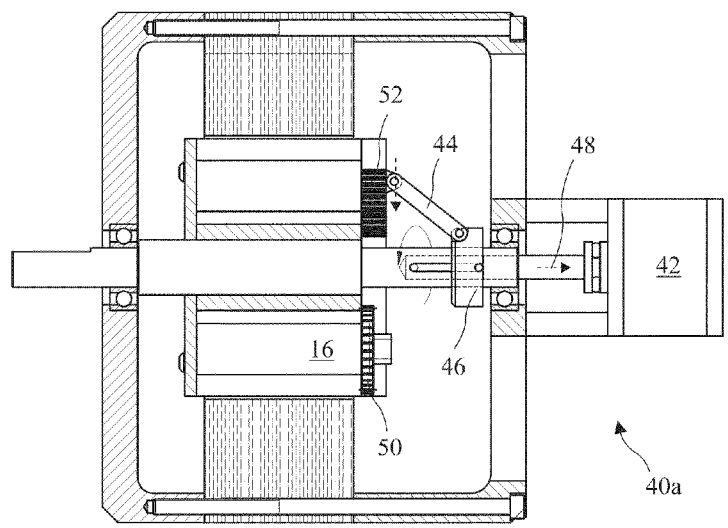 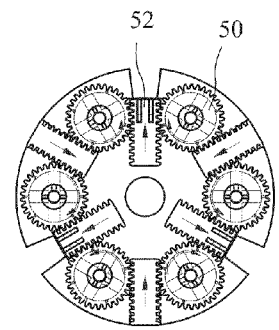
FIG. 19A
FIG. 19B
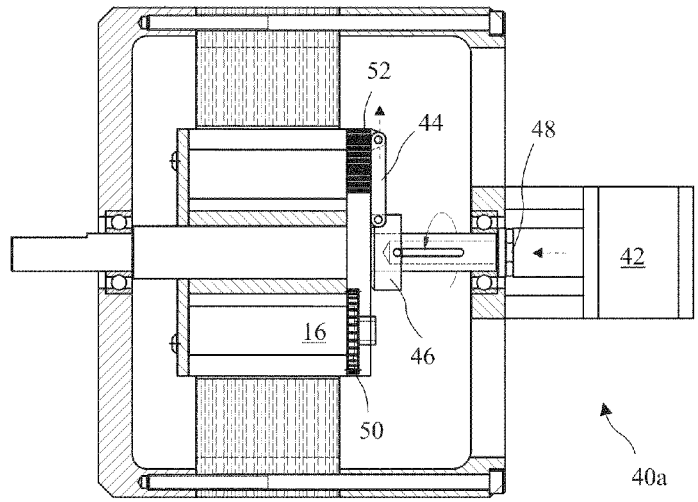 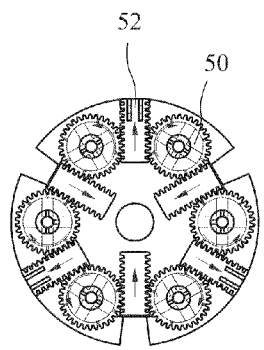
FIG. 20A
FIG. 20B

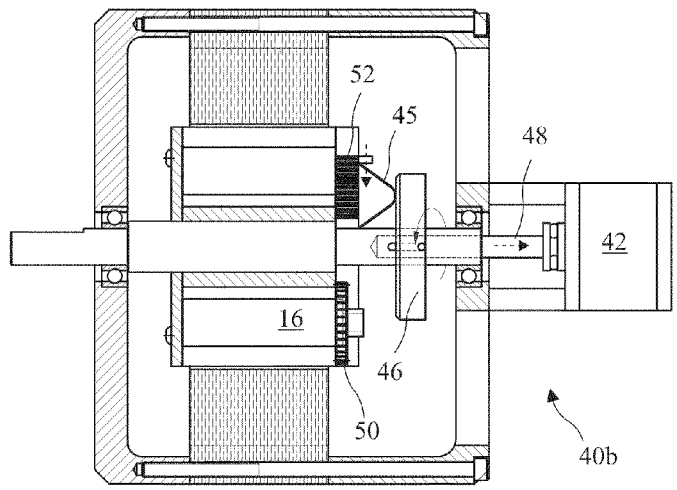
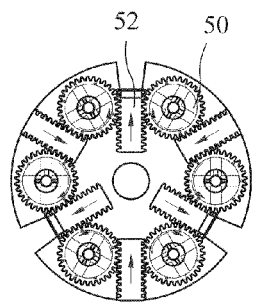
FIG. 21A
FIG. 21B
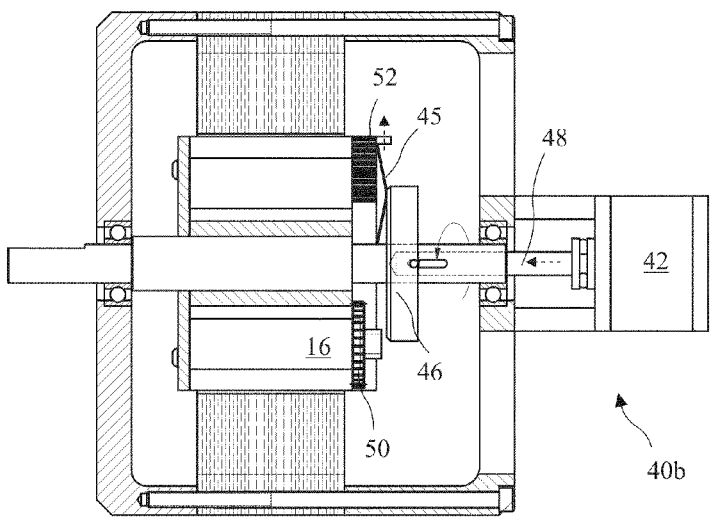
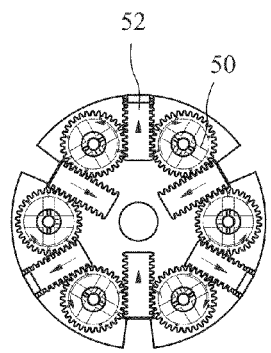
FIG. 22A
FIG. 22B

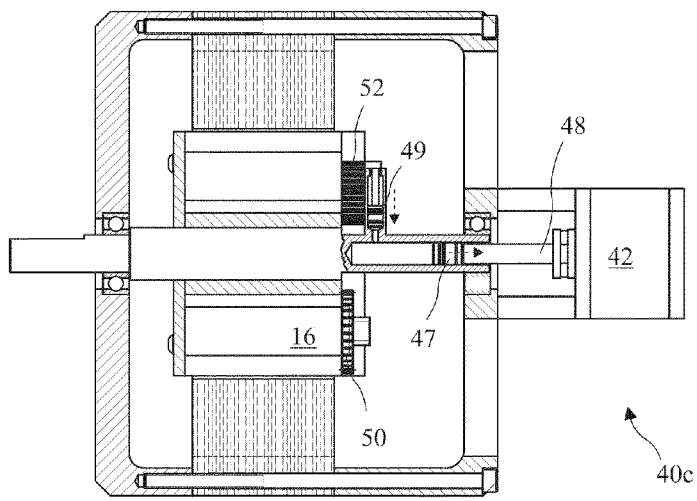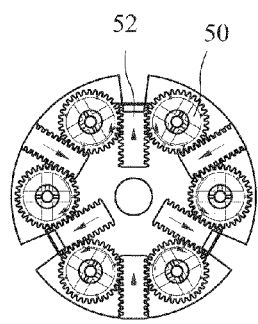
FIG. 23A
FIG. 23B
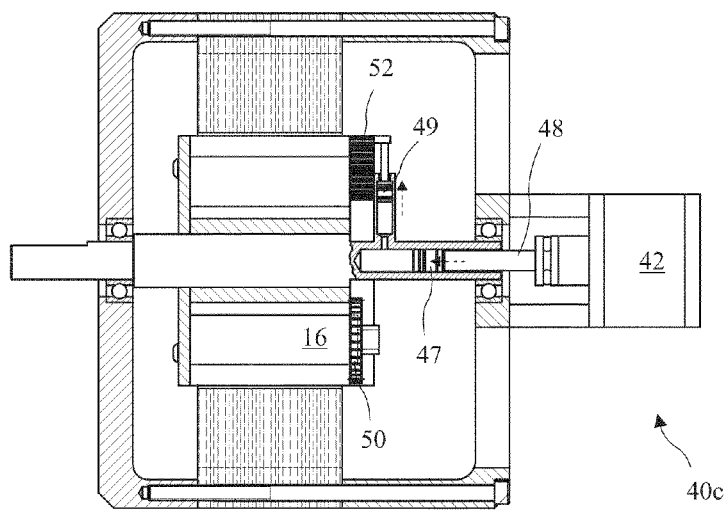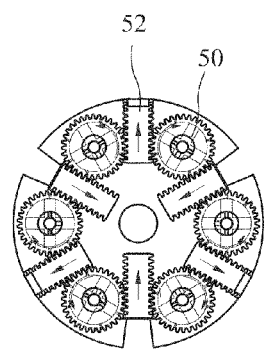
FIG. 24A
FIG. 24B

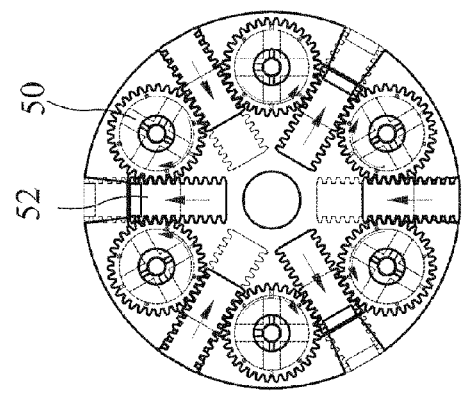
FIG. 27B
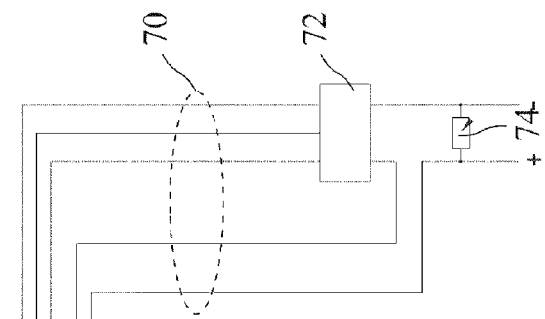
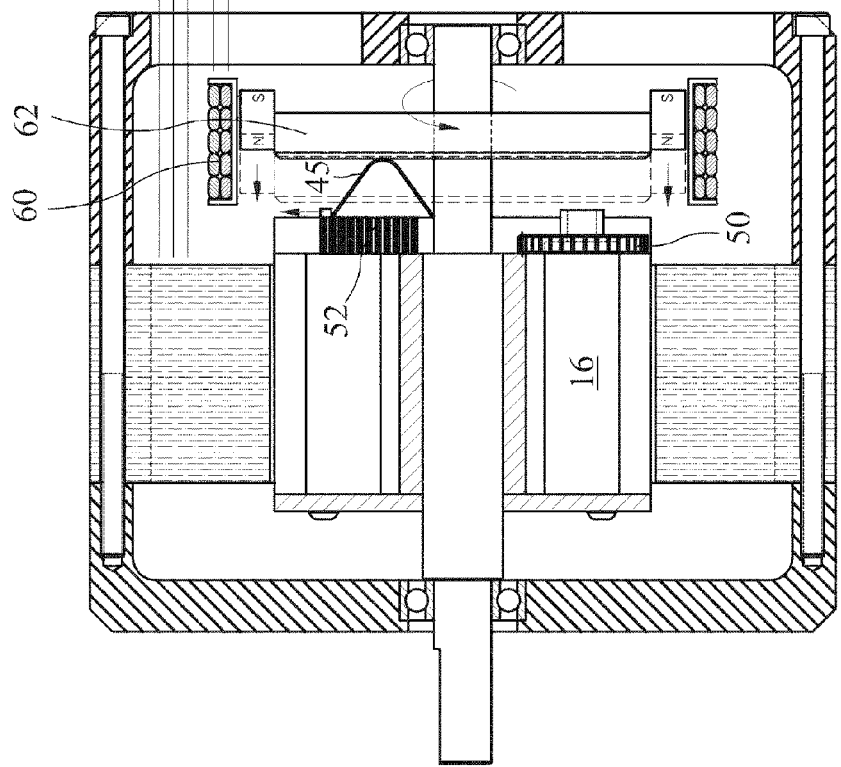
FIG. 27A

ELECTRIC MOTOR AND/OR GENERATOR WITH MECHANICALLY TUNEABLE PERMANENT MAGNETIC FIELD

BACKGROUND OF THE INVENTION

The present invention relates to electric motors and generators and in particular to adjusting the orientation of fixed magnets in a rotor to obtain efficient operation at various RPM.

Brushless DC motors are often required to operate at various RPM but can only achieve efficient over a limited RPM range.

Further, generators and alternators are often required to operate over a broad RPM range. For example, automotive alternators operate at an RPM proportional to engine RPM and windmill alternators operate at an RPM proportional to wind speed. Unfortunately, known alternators generate electricity at a voltage proportion to RPM. Because RPM cannot be controlled, other elements are required to adjust the output voltage, adding inefficiency, complexity, and cost to the alternator systems.

Some designs have attempted to broaden RPM range using "field weakening" to allow the motor base speed (Kt or torque sensitivity) to be wound to be efficient at very low RPM, which is proportional to torque (lower RPM higher torque and vice versa), and to obtain efficient high RPM operation. Such field weakening can be in an Interior Permanent Magnet Synchronous Motor (IPMSM) or AC synchronous induction motors three to four times base speed with reasonable efficiency at high RPM but a motor with a ten times base speed RPM would have two and one-half to three and one-half times the starting torque of an AC motor. Unfortunately, field weakening with conventional methods can sacrifice efficiency and increase the complexity of controller algorithms and software.

In a generator/alternator application, the output voltage is proportional to magnetic flux strength requiring an inverter or separate electromagnetic exciter coil in automotive alternators that are only 60-70% efficient because of the very wide RPM range the alternators must operate over. Similar issues are present in wind power generation where variations in wind speed encountered resulting in operating inefficiencies.

BRIEF SUMMARY OF THE INVENTION

The present invention addresses the above and other needs by providing apparatus and method for tuning the magnetic field of brushless motors and alternators to obtain efficient operation over a broad RPM range. The motor or alternator includes fixed windings (or stator) around a rotating rotor carrying permanent magnets. The permanent magnets are cylindrical and have North (N) and South (S) poles formed longitudinally in the cylindrical magnets. The magnets reside in magnetic conducing pole pieces (for example, low carbon or soft steel, and/or laminated insulated layers, of non-magnetizable material). Rotating the cylindrical permanent magnets inside the pole pieces either strengthens or weakens the resulting magnetic field to adjust the motor or alternator for low RPM torque or for more efficient high RPM operation. Varying the rotor magnetic field adjusts the voltage output of the alternators allowing, for example, a windmill generator, to maintain a fixed voltage output. Other material used in the rotor is generally non-magnetic, for example, stainless steel.

In accordance with one aspect of the present invention, there are provided apparatus and methods to vary the flux strength of rotor/armature in an electric motor to provide improved starting torque and high RPM efficiency.

In accordance with another aspect of the present invention, there are provided apparatus and methods to vary the magnetic flux strength of rotor/armature in generator/alternator applications to control output voltage independent of RPM. Many known alternator applications cannot control alternator RPM, for example, automotive alternators which must operate at an RPM proportional to engine RPM and wind power generation which are subject to wind speed. Varying the magnetic flux strength of rotor/armature allows output voltage to be controlled independently of RPM thereby eliminating the need for an inverter or separate electromagnetic exciter coil.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 16 is an end view of a hybrid tunable permanent internal magnet and fixed external magnet rotor, in the flux squeeze configuration, according to the present invention.

FIG. 17A is an end view of the hybrid tunable permanent internal magnet and fixed external magnet rotor, in the flux squeeze configuration, tuned for a maximum magnetic field according to the present invention.

FIG. 17B is an end view of the hybrid tunable permanent internal magnet and fixed external magnet rotor, in the flux squeeze configuration, tuned for a minimum magnetic field according to the present invention.

FIG. 18 is an end view of an element for constructing a laminated pole piece.

FIG. 18A is a detail 18A of FIG. 18.

FIG. 19A is a side view of a first embodiment of apparatus for adjusting the cylindrical two pole permanent magnets in a first magnet position.

FIG. 19B is an end view of the first embodiment of apparatus for adjusting the cylindrical two pole permanent magnets in the first magnet position.

FIG. 20A is a side view of the first embodiment of apparatus for adjusting the cylindrical two pole permanent magnets in a second magnet position.

FIG. 20B is an end view of the first embodiment of apparatus for adjusting the cylindrical two pole permanent magnets in the second magnet position.

FIG. 21A is a side view of a second embodiment of apparatus for adjusting the cylindrical two pole permanent magnets in a first magnet position.

FIG. 21B is an end view of the second embodiment of apparatus for adjusting the cylindrical two pole permanent magnets in the first magnet position.

FIG. 22A is a side view of the second embodiment of apparatus for adjusting the cylindrical two pole permanent magnets in a second magnet position.

FIG. 22B is an end view of the second embodiment of apparatus for adjusting the cylindrical two pole permanent magnets in the second magnet position.

FIG. 23A is a side view of a third embodiment of apparatus for adjusting the cylindrical two pole permanent magnets in a first magnet position.

FIG. 23B is an end view of the third embodiment of apparatus for adjusting the cylindrical two pole permanent magnets in the first magnet position.

FIG. 24A is a side view of the third embodiment of apparatus for adjusting the cylindrical two pole permanent magnets in a second magnet position.

FIG. 24B is an end view of the third embodiment of apparatus for adjusting the cylindrical two pole permanent magnets in the second magnet position.

FIG. 27A is a side view of a biasing system for controlling magnet positions for a generator according to the present invention.

FIG. 27B is an end view of the biasing system for controlling magnet positions for a generator according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
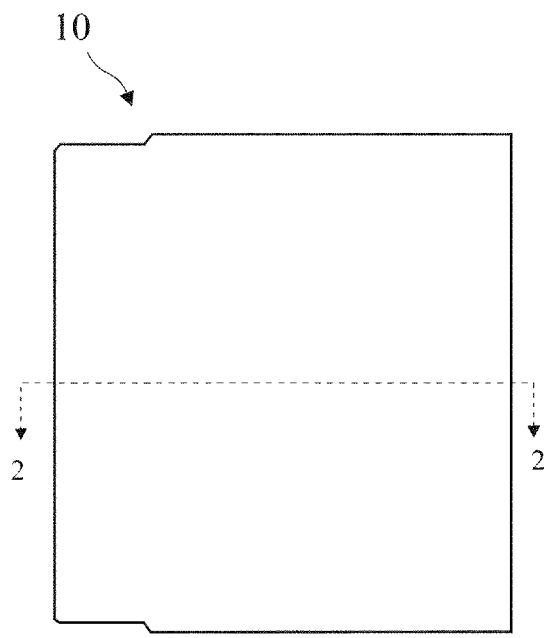
FIG. 1A is a side view of a reconfigurable electric motor according to the present invention.
Figure 1B:
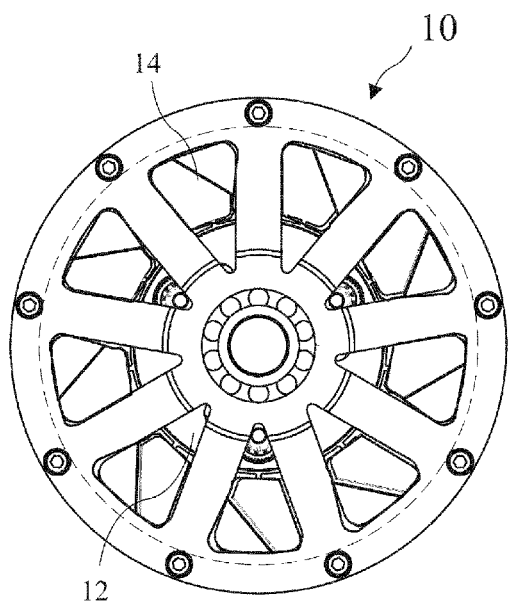
FIG. 1B is an end view of the reconfigurable electric motor.
Figure 2:
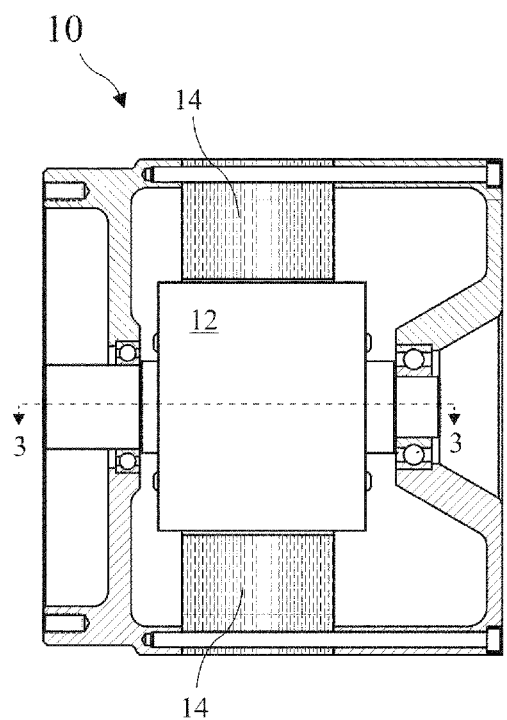
FIG. 2 is a cross-sectional view of the reconfigurable electric motor according to the present invention taken along line 2-2 of FIG. 1A.

A side view of a reconfigurable electric motor 10 according to the present invention is shown in FIG. 1A, an end view of the reconfigurable electric motor 10 is shown in FIG. 1B, and a cross-sectional view of the reconfigurable electric motor 10 taken along line 2-2 of FIG. 1A is shown in FIG. 2. The motor 20 includes stator windings 14 and a rotor 12 residing inside the stator windings 14. The motor 10 is a brushless AC inductive motor including at least one permanent magnet 16 (see FIGS. 3-7) in the rotor 12, which magnet 16 may be adjusted to provide a weak magnetic field at startup for initial asynchronous operation and a strong magnetic field after startup for efficient synchronous operation. According to the present invention taken along line 2-2 of FIG. 1A.

Figure 3:
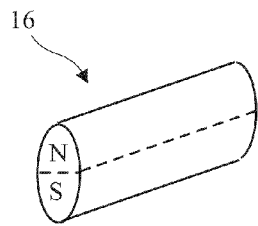
FIG. 3 is a perspective view of a cylindrical two pole permanent magnet according to the present invention.
Figure 4:
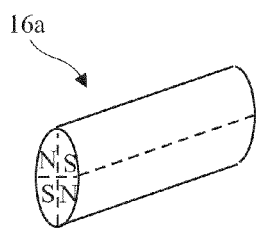
FIG. 4 is a perspective view of a cylindrical four pole permanent magnet according to the present invention.

A perspective view of a cylindrical two pole permanent magnet 16 according to the present invention is shown in FIG. 3 and a perspective view of a cylindrical four pole permanent magnet 16a according to the present invention is shown in FIG. 4. The poles of the magnet 16 and 16a run the lengths of the magnets as indicated by dashed lines.

Figure 5A:
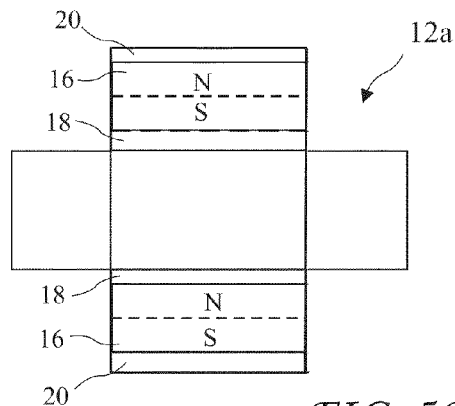
FIG. 5A is a side view of a tunable permanent magnet rotor according to the present invention, in a radially aligned configuration.
Figure 5B:
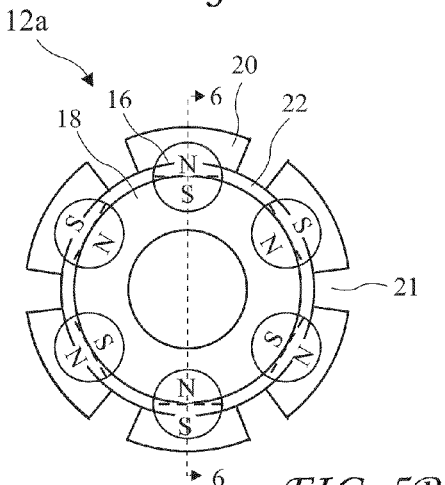
FIG. 5B is an end view of the tunable permanent magnet rotor according to the present invention, in the radially aligned configuration.

A side view of a tunable permanent magnet rotor 12a according to the present invention, in a radially aligned configuration, is shown in FIG. 5A and an end view of the tunable permanent magnet rotor 12a, in the radially aligned configuration, is shown in FIG. 5B. The rotor 12a includes the magnets 16, an inner pole piece 18, outer pole pieces 20, and non-magnetic spacer 22. The pole pieces are a magnetically conducting but non-magnetizable material which conduct the magnetic field of the magnet 16 to create a rotor magnetic field. The spacer 22 separates the inner pole piece 18 from the outer pole pieces 20 and air gaps separate the outer pole pieces 20.

Figure 6A:
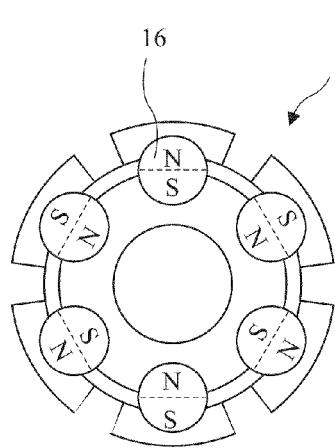
FIG. 6A is an end view of a tunable permanent magnet rotor according to the present invention, in the radially aligned configuration, with the permanent two pole magnets aligned for a maximum (or strong) magnetic field.
Figure 6B:
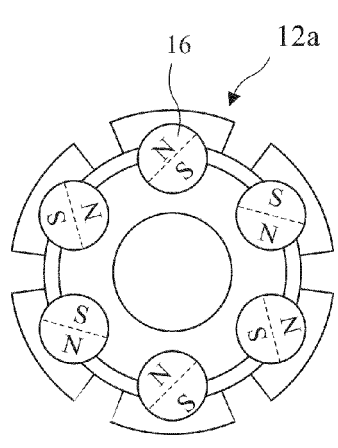
FIG. 6B is an end view of a tunable permanent magnet rotor according to the present invention, in a radially aligned configuration, with the permanent two pole magnets aligned for a medium magnetic field.
Figure 6C:
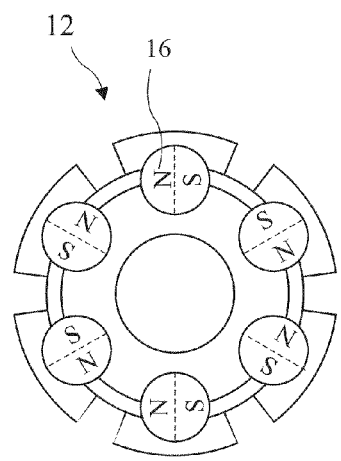
FIG. 6C is an end view of a tunable permanent magnet rotor according to the present invention, in the radially aligned configuration, with the permanent two pole magnets aligned for a minimum (or weak) magnetic field.

An end view of a tunable permanent magnet rotor 12a, with the permanent two pole magnets 16 aligned for a maximum (or strong) magnetic field 24a (see FIG. 7A) is shown in FIG. 6A, an end view of a tunable permanent magnet rotor 12a with the permanent two pole magnets 16 aligned for a medium magnetic field is shown in FIG. 6B, and an end view of a tunable permanent magnet rotor 12a, with the permanent two pole magnets 16 aligned for a minimum (or weak) magnetic field 24b (see FIG. 7B) is shown in FIG. 6C. In an electric motor, the alignment providing a strong magnetic field provide hi torque at low RPM and the alignment providing a weak magnetic field provide efficient operation at high RPM. In a generator, the output voltage may be adjusted by adjusting the magnet alignment allowing constant voltage in generators having varying RPM, such as automotive alternators and wind power generators.

Figure 7A:
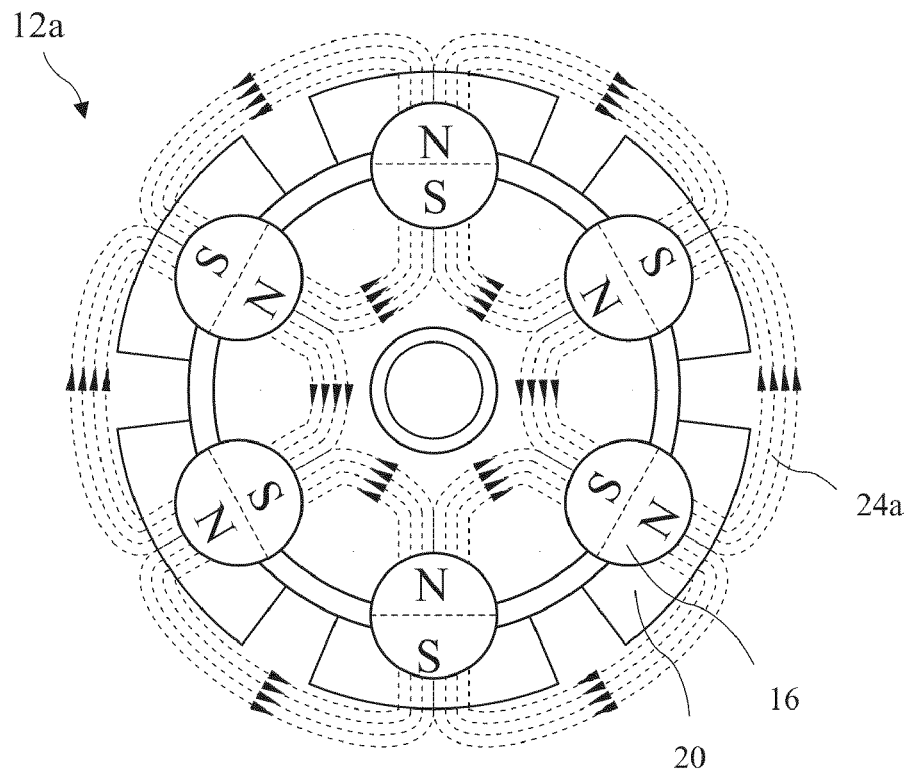
FIG. 7A shows the strong magnetic field corresponding to FIG. 6A.
Figure 7B:
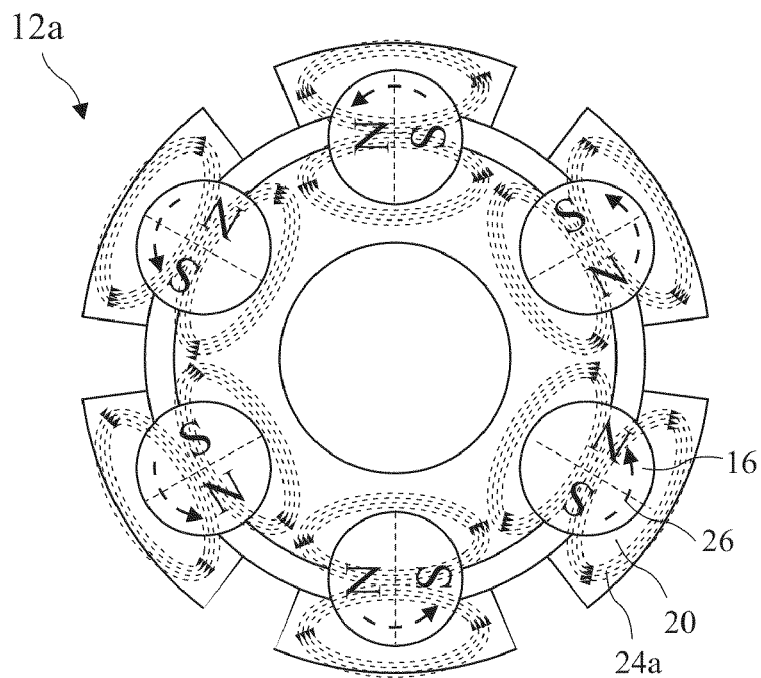
FIG. 7B shows the weak magnetic field corresponding to FIG. 6C.

The strong magnetic field 24a corresponding to FIG. 6A is shown in FIG. 7A and the weak magnetic field corresponding to FIG. 6C is shown in FIG. 7B.

Figure 8:
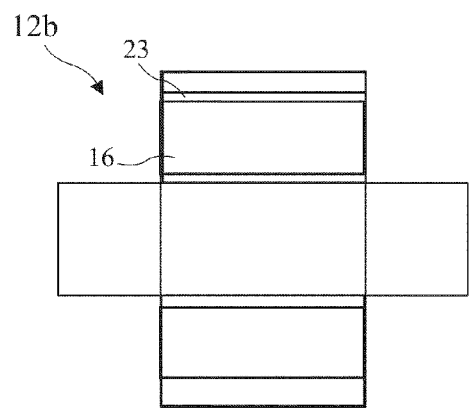
FIG. 8 is a side view of a tunable permanent magnet rotor according to the present invention, in a flux squeeze configuration.
Figure 9:
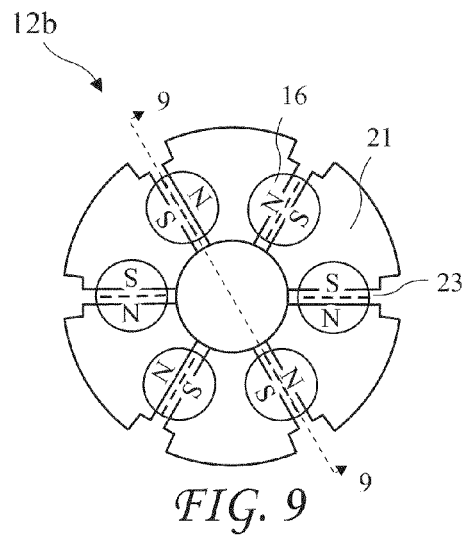
FIG. 9 is an end view of the tunable permanent magnet rotor according to the present invention, in the flux squeeze configuration.

A side view of a tunable permanent magnet rotor 12b according to the present invention, in a flux squeeze configuration, is shown in FIG. 8 and an end view of the tunable permanent magnet rotor 12b shown in FIG. 9. The rotor 12b includes the magnets 16, pole pieces 21, and air gaps 23. The pole pieces are a magnetically conducting but non-magnetizable material which conduct the magnetic field of the magnet 16 to create a rotor magnetic field. The air gaps 23 separate the outer pole pieces 21.

Figure 10A:
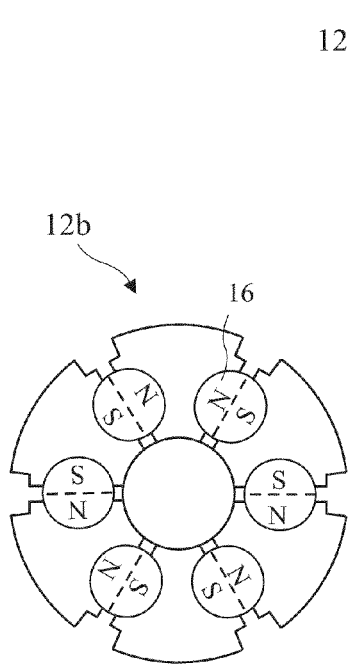
FIG. 10A is an end view of a tunable permanent magnet rotor according to the present invention, in the flux squeeze configuration, with the permanent two pole magnets aligned for a maximum (or strong) magnetic field.
Figure 10B:
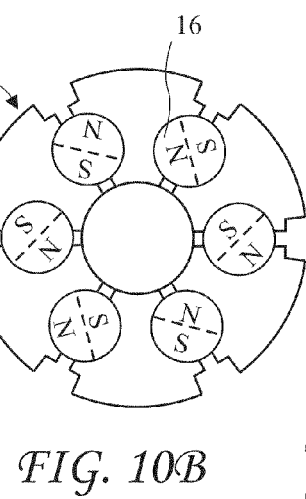
FIG. 10B is an end view of a tunable permanent magnet rotor according to the present invention, in a flux squeeze configuration, with the permanent two pole magnets aligned for a medium magnetic field.
Figure 10C:
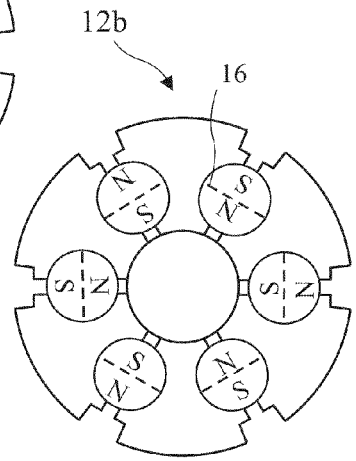
FIG. 10C is an end view of a tunable permanent magnet rotor according to the present invention, in the flux squeeze configuration, with the permanent two pole magnets aligned for a minimum (or weak) magnetic field.
Figure 11A:
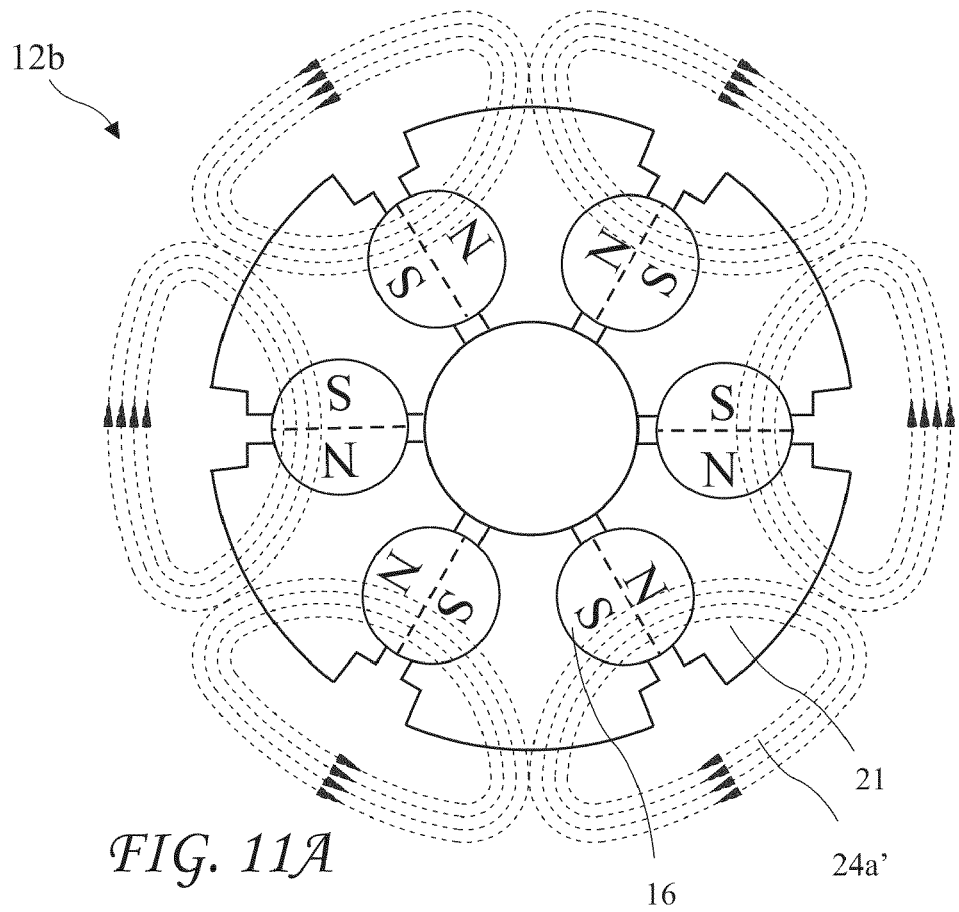
FIG. 11A shows the strong magnetic field corresponding to FIG. 10A.
Figure 11B:
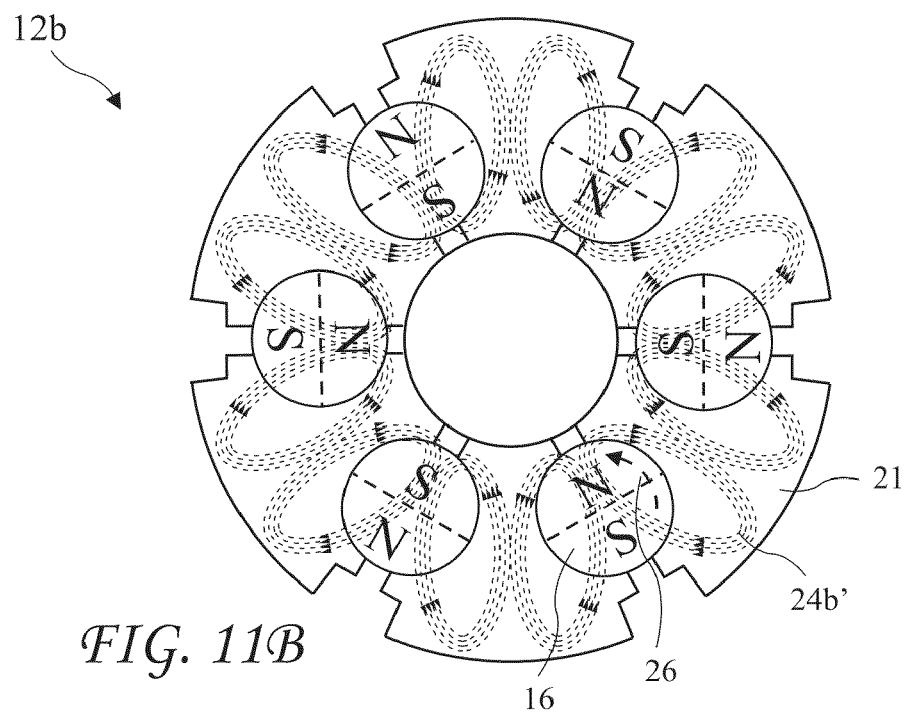
FIG. 11B shows the weak magnetic field corresponding to FIG. 10C.

An end view of a tunable permanent magnet rotor 12b, with the permanent two pole magnets 16 aligned for a maximum (or strong) magnetic field 24a' (see FIG. 11A) is shown in FIG. 10A, an end view of a tunable permanent magnet rotor 12b with the permanent two pole magnets 16 aligned for a medium magnetic field is shown in FIG. 11B, and an end view of a tunable permanent magnet rotor 12b, with the permanent two pole magnets 16 aligned for a minimum (or weak) magnetic field 24b' (see FIG. 11B) is shown in FIG. 10C. In an electric motor, the alignment providing a strong magnetic field provide hi torque at low RPM and the alignment providing a weak magnetic field provide efficient operation at high RPM. In a generator, the output voltage may be adjusted by adjusting the magnet alignment allowing constant voltage in generators having varying RPM, such as automotive alternators and wind power generators.

The strong magnetic field 24a' corresponding to FIG. 10A is shown in FIG. 11A and the weak magnetic field corresponding to FIG. 10C is shown in FIG. 11B.

Figure 12:
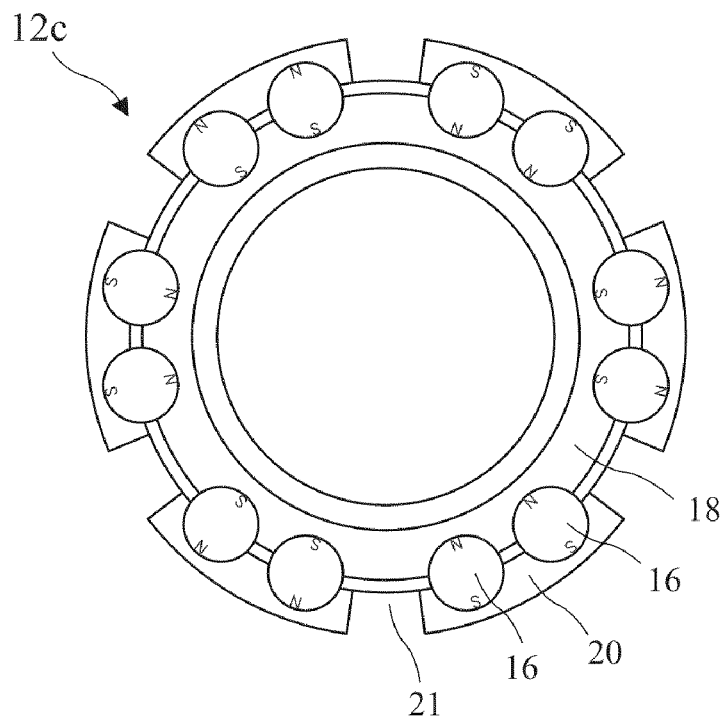
FIG. 12 is an end view of a tunable permanent magnet rotor according to the present invention, having pairs of the cylindrical two pole permanent magnets in the radially aligned configuration.
Figure 13:
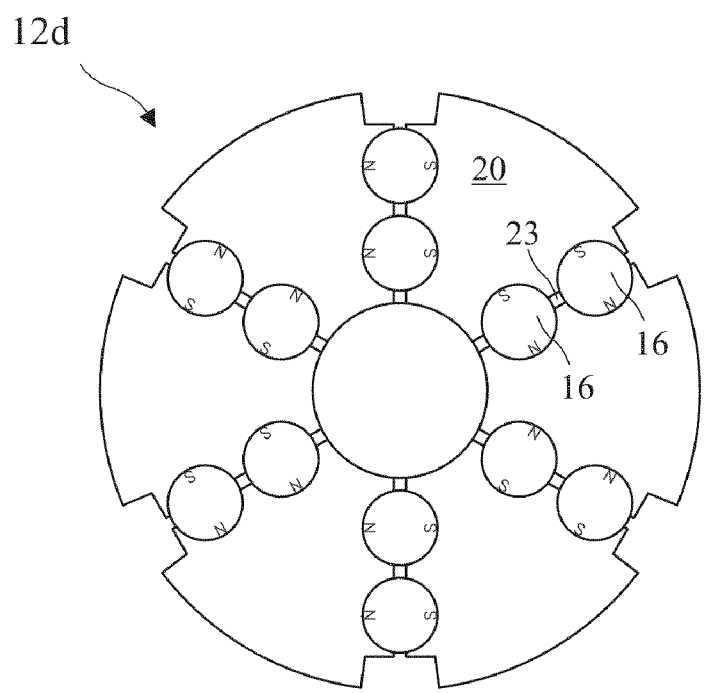
FIG. 13 is an end view of a tunable permanent magnet rotor according to the present invention, having pairs of the cylindrical two pole permanent magnets in the flux squeeze configuration.

An end view of a tunable permanent magnet rotor 12c according to the present invention, having pairs of the cylindrical two pole permanent magnets 16 in the radially aligned configuration is shown in FIG. 12 and an end view of a tunable permanent magnet rotor 12d according to the present invention, having pairs of the cylindrical two pole permanent magnets 16 in the flux squeeze configuration is shown in FIG. 13. The present invention is not limited to single or pairs of magnets, and any number of magnets may be grouped as appropriate for the application. For example, three, four, five, or more magnets may replace the pairs of magnets in FIGS. 12 and 13.

Figure 15B:
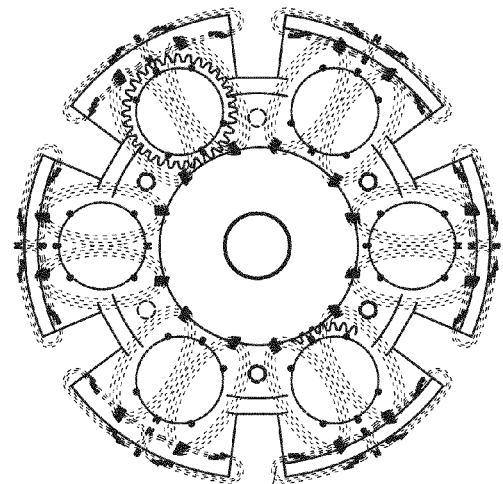
FIG. 15B is an end view of the hybrid tunable permanent internal magnet and fixed external magnet rotor, in the radially aligned configuration, tuned for a minimum magnetic field according to the present invention.
Figure 14:
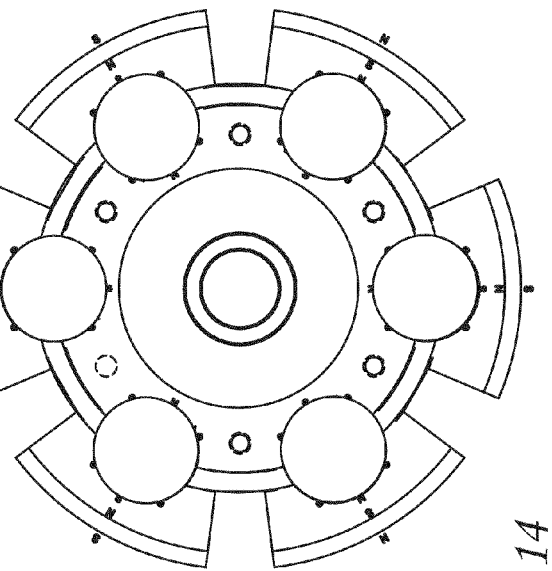
FIG. 14 is an end view of a hybrid tunable permanent internal magnet and fixed external magnet rotor, in the radially aligned configuration, according to the present invention.
Figure 15A:
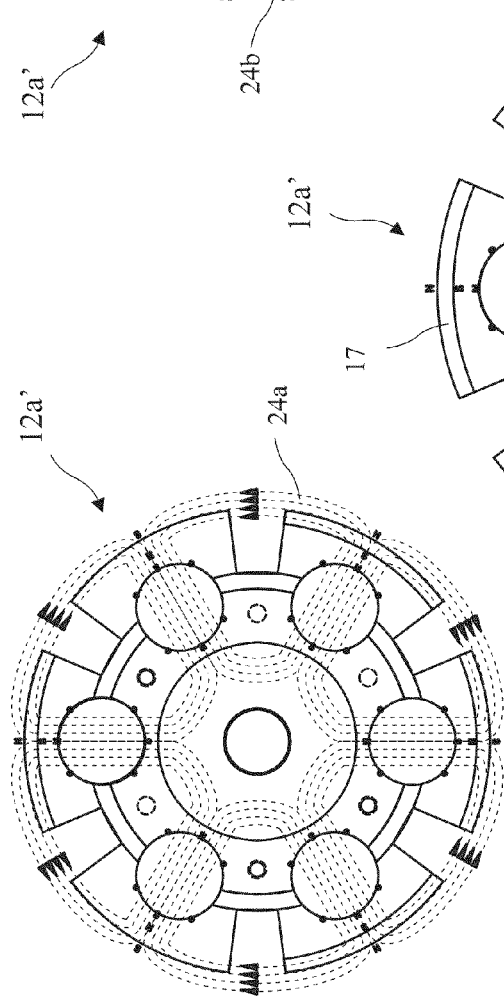
FIG. 15A is an end view of the hybrid tunable permanent internal magnet and fixed external magnet rotor, in the radially aligned configuration, tuned for a maximum magnetic field according to the present invention.

An end view of a hybrid rotor 12a' including tunable permanent internal magnets 16 and fixed external magnets 17, in the radially aligned configuration, according to the present invention, is shown in FIG. 14. The combination of the tunable permanent internal magnets 16 and fixed external magnets 17 allows additional design of the rotor magnetic field. An end view of the hybrid tunable permanent internal magnet and fixed external magnet rotor 12a', tuned for a maximum magnetic field, is shown in FIG. 15A and an end view of the hybrid tunable permanent internal magnet and fixed external magnet rotor 12a' tuned for a minimum magnetic field is shown in FIG. 15B.

An end view of a hybrid rotor 12b' including tunable permanent internal magnets 16 and fixed external magnets 17, in the flux squeeze configuration, according to the present invention, is shown in FIG. 16. The combination of the tunable permanent internal magnets 16 and fixed external magnets 17 allows additional design of the rotor magnetic field. An end view of the hybrid tunable permanent internal magnet and fixed external magnet rotor 12b', tuned for a maximum magnetic field, is shown in FIG. 17A and an end view of the hybrid tunable permanent internal magnet and fixed external magnet rotor 12b' tuned for a minimum magnetic field is shown in FIG. 15B.

An end view of an element 30 for constructing a laminated pole piece is shown in FIG. 18 and detail 18A of FIG. 18 is shown in FIG. 18A. Rotors are often constructed from laminating a multiplicity of elements 30, each element 30 coated by an electrical insulation. The element 30 has radius Rr, c round cutouts 32 for the cylindrical magnets 16 having a radius Rm, and air gaps having a width Wag 34.

A side view of a first embodiment of apparatus 40a for adjusting the cylindrical two pole permanent magnets 16 in a first magnet position is shown in FIG. 19A, an end view of the apparatus 40a for adjusting the cylindrical two pole permanent magnets in the first magnet position is shown in FIG. 19B, a side view of the apparatus 40a for adjusting the cylindrical two pole permanent magnets 16 in a second magnet position is shown in FIG. 20A, and an end view of the apparatus 40a for adjusting the cylindrical two pole permanent magnets in the second magnet position is shown in FIG. 20B. The apparatus for adjusting 40a includes a linear motor 42 which is preferably a stepper motor, a shaft 48 actuated axially by the linear motor 42, and ring 46 axially actuated by the shaft 48, and an arm 44 actuated by the ring 46 and connected to one of six toothed racks 52. The toothed racks 52 engaged gears 50 attached to the magnets 16 to rotate the magnets 16. Actuation of the shaft 48 to the right pulls the toothed rack 52 radially in and actuation of the shaft 48 to the left pushed the toothed rack 52 radially out, thereby directly rotating the magnets with gears 50 directly engaging the toothed rack 52, and the remaining magnets 16 are coupled to the actuation by the toothed racks between the adjacent gears 50.

A side view of a second embodiment of apparatus 40b for adjusting the cylindrical two pole permanent magnets 16 in a first magnet position is shown in FIG. 21A, an end view of the apparatus 40b for adjusting the cylindrical two pole permanent magnets in the first magnet position is shown in FIG. 21B, a side view of the apparatus 40b for adjusting the cylindrical two pole permanent magnets 16 in a second magnet position is shown in FIG. 22A, and an end view of the apparatus 40b for adjusting the cylindrical two pole permanent magnets in the second magnet position is shown in FIG. 22B. The apparatus for adjusting 40b includes the linear motor 42 which is preferably a stepper motor, a shaft 48 actuated axially by the linear motor 42, and ring 46 axially actuated by the shaft 48, and a bent elbow 45 actuated by the ring 46 and connected to one of six toothed racks 52. The bent elbow 45 is biased to a bent position, for example, with a 90 degree bend. When the ring 46 moves to the right to release the bent arm 45, the bent arm 45 relaxes to the bent position and pulls the toothed rack 52 radially in. When the ring 46 moves to the left to exert force on the bent arm 45, the bent arm 45 straightens and pushes the toothed rack 52 radially out. The toothed racks 52 engaged gears 50 attached to the magnets 16 to rotate the magnets 16. Actuation of the linear motor 42 to the right thus pulls the toothed rack 52 radially in and actuation of the linear motor 42 to the left pushed the toothed rack 52 radially out, thereby directly rotating the magnets 16 with gears 50 directly engaging the toothed rack 52, and the remaining magnets 16 are coupled to the actuation by the toothed racks 52 between the adjacent gears 50.

A side view of a third embodiment of apparatus 40c for adjusting the cylindrical two pole permanent magnets 16 in a first magnet position is shown in FIG. 23A, an end view of the apparatus 40c for adjusting the cylindrical two pole permanent magnets in the first magnet position is shown in FIG. 23B, a side view of the apparatus 40c for adjusting the cylindrical two pole permanent magnets 16 in a second magnet position is shown in FIG. 24A, and an end view of the apparatus 40c for adjusting the cylindrical two pole permanent magnets in the second magnet position is shown in FIG. 24B. The apparatus for adjusting 40c includes the linear motor 42 which is preferably a stepper motor, a shaft 48 actuated axially by the linear motor 42, a first piston 47 connected to the shaft 48 and a second piston 49 in fluid communication with the piston 47 and connected to one of the six toothed racks 52. When the piston 47 moves to the right the second piston 49 is drawn radially in and the toothed rack 52 is pulled radially in. When the ring 46 moves to the left the piston 47 moves to the left and the piston 49 moves radially out and pushes the toothed rack 52 radially out. The toothed racks 52 engaged gears 50 attached to the magnets 16 to rotate the magnets 16. Actuation of the linear motor 42 to the right thus pulls the toothed rack 52 radially in and actuation of the linear motor 42 to the left pushed the toothed rack 52 radially out, thereby directly rotating the magnets 16 with gears 50 directly engaging the toothed rack 52, and the remaining magnets 16 are coupled to the actuation by the toothed racks 52 between the adjacent gears 50.

Figure 25A:
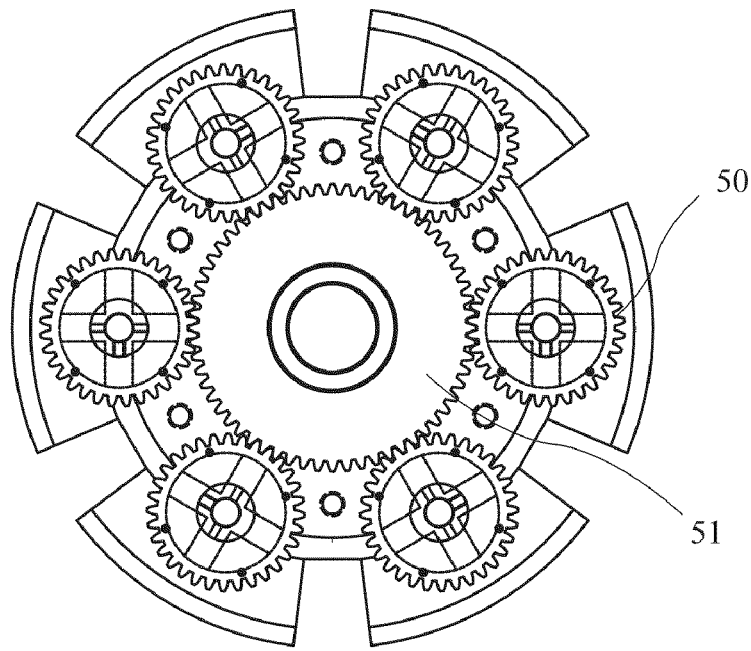
FIG. 25A is an alternative gear apparatus for adjusting the positions of the cylindrical two pole internal permanent magnets of the hybrid tunable permanent internal magnet and fixed external magnet rotor, in the radially aligned configuration, according to the present invention.

Additional gear apparatus according to the present invention for adjusting the positions of the cylindrical two pole internal permanent magnets 16 of the hybrid tunable permanent internal magnet and fixed external magnet rotor, in the radially aligned configuration, is shown in FIG. 25A. Small magnet gears 50 are fixed to an end of each magnet 16. A large center gear 51 engages each of the small magnet gears 50 and causes each of the magnets 16 to maintain approximately (some gear lash may exist as long as the magnets are closely aligned) the same alignment and may be turned to adjust the alignment of the magnets 16 from the weak field to the strong field.

Figure 25B:
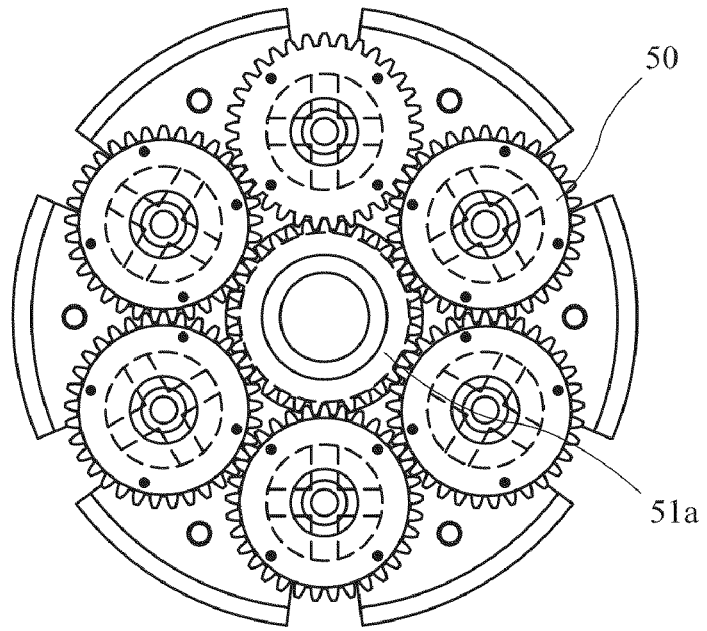
FIG. 25B is an alternative gear apparatus for adjusting the positions of the cylindrical two pole internal permanent magnets of the hybrid tunable permanent internal magnet and fixed external magnet rotor, in the flux squeeze configuration, according to the present invention.

Additional gear apparatus for adjusting the positions of the cylindrical two pole internal permanent magnets of the hybrid tunable permanent internal magnet and fixed external magnet rotor, in the flux squeeze configuration, according to the present invention is shown in FIG. 25B. A small center gear 51a engages alternate ones of the small magnet gears 50, and the small gears 50 engage each adjacent gear 50, and causes each of the magnets 16 to maintain approximately (some gear lash may exist as long as the magnets are closely aligned) the same alignment and may be turned to adjust the alignment of the magnets 16 from the weak field to the strong field.

Figure 26B:
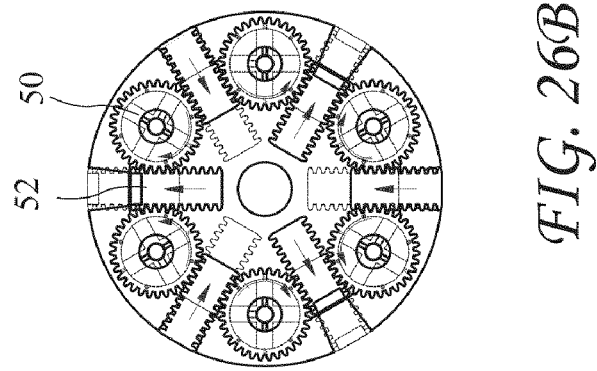
FIG. 26B is an end view of the biasing system for controlling magnet positions for a motor according to the present invention.
Figure 26A:
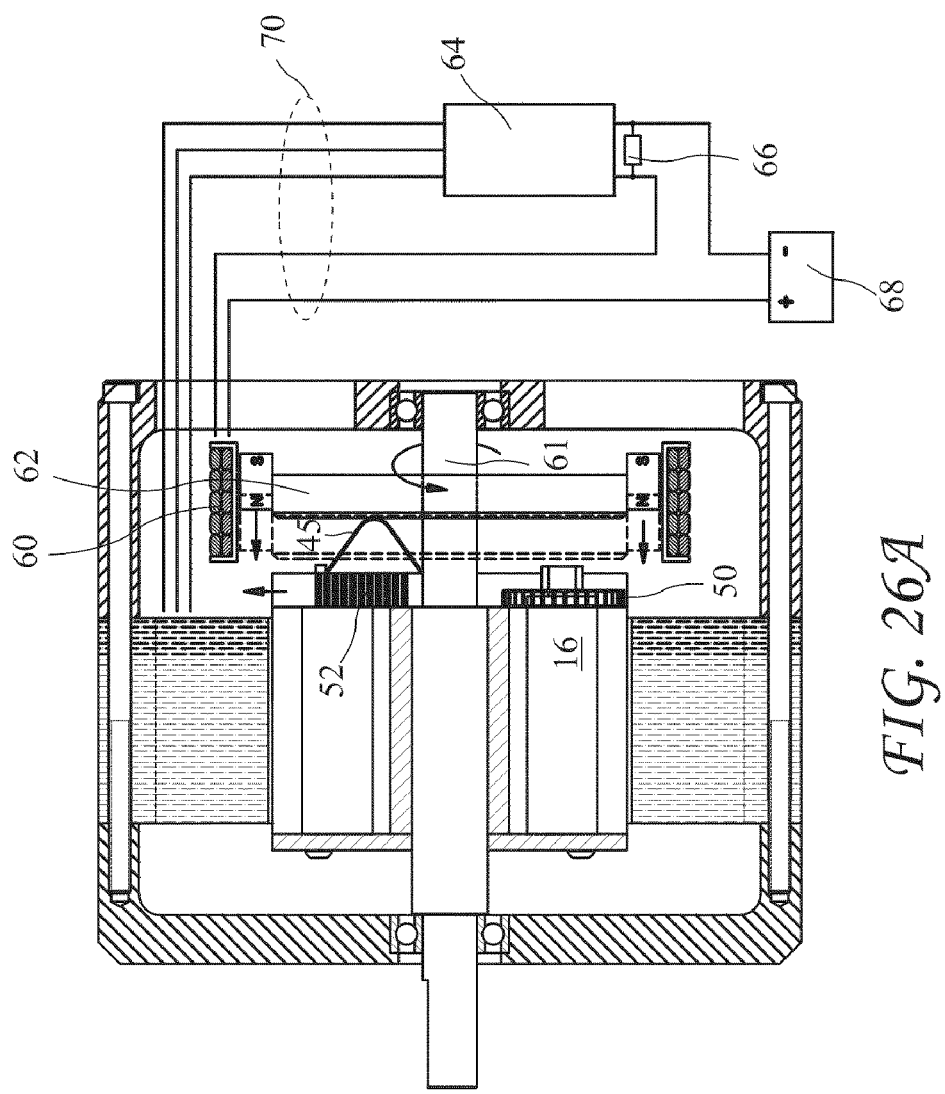
FIG. 26A is a side view of a biasing system for controlling magnet positions for a motor according to the present invention.

A side view of a biasing system for controlling magnet positions for a motor according to the present invention is shown in FIG. 26A and an end view of the biasing system for controlling magnet positions for the motor through wires 70 is shown in FIG. 26B. A control 64 converts single phase DC voltage from a source 68 to three phase trapezoidal or sinusoidal wave form for a three phase motor. One DC input line to a field coil 60 used to create an electromagnetic field proportional to a load on the motor. The field coil 60 has very low resistance and does not reduce input voltage to the motor or increase resistance appreciably. The field acts on a disk 62 and pushes the disk to the left against the bent elbow 45 to rotate the magnets 16.

As the motor load increases, the electromagnetic field is increased proportionally with load, the calibrated load is just slightly less than required to overpower the rotation of the magnets 16, the tipping circuit 66 is a shunting controller which provides a small current that added to the electromagnetic force of the bias armature 62 provides the final force to control the rotation of magnets 16 which controls the magnetic field of the rotor. The controller 64 is preferably an inverter type which converts single phase DC to a three phase wave form which energizes the stator fields to rotate the rotor.

The biasing actuator comprises the ultra low resistance coil 60 and armature 62 which produces force proportional to the load current that forces against the inherent nature of magnets 16 to rest in the weak magnetic field position. The tipping circuit 66 is a low force trigger control that contributes an extra current to the biasing actuator which can rotate the magnets 16 to adjust magnetic field to either strong or weak positions using very little electrical power.

A side view of a biasing system for controlling magnet 16 positions for a generator according to the present invention is shown in FIG. 27A and an end view of the biasing system for controlling magnet 16 positions for a generator is shown in FIG. 27B. The generator may be driven to create the phase, or any phase, of power as a generator/alternator.

The output of generator/alternator phase power is generally passed through a six diode array 72 which converts the multi phase currents to single phase DC. The output of one of the output DC lines are diverted into the low resistance biasing coil 60 and armature 62 which create an opposing force against the natural rotation of the magnets 16 to the weak field position. In the same fashion as the motor configuration of FIGS. 26A and 26B, the tipping control provides the little extra current to the coil 60 and armature 62 to overcome magnet force to control the position of rotation of magnets and magnetic field. The tipping circuit controller is an electronic transistor type switch which can provide a variable amount of power to be added to the biasing force of the coil 60 and armature 62.

While the invention herein disclosed has been described by means of specific embodiments and applications thereof, numerous modifications and variations could be made thereto by those skilled in the art without departing from the scope of the invention set forth in the claims.

We claim:

1. A cooperating rotor and stator assembly for use in an electric motor or generator converting between electrical and mechanical power, the rotor and stator assembly comprising:
   a fixed stator having electrical stator windings;
   a rotating rotor residing inside the stator and including a
      magnetically conducting circuit including comprising:
         pole pieces fixed to the rotor made from magnetically conducting non-magnetizable material; and internal rotatable permanent rotor magnets having axially extending north (N) and south (S) poles facing towards the pole pieces to create a strong magnetic field cooperation with the stator windings and rotatable to face away from the pole pieces to create a weak magnetic field cooperation with the stator windings.

2. The rotor and stator assembly of claim 1, wherein:
the pole pieces are in a radially aligned configuration;
the pole pieces reside on the exterior of the rotor;
the rotor magnets reside radially under the pole pieces;
the N and S poles of the rotor magnets are radially aligned to create magnetic field lines passing radially through a first rotor magnet and a first pole piece residing over the first rotor magnet, angularly over the first pole piece and over a second pole piece next to the first pole piece, radially through the second pole piece and a second rotor magnet residing under the second pole piece, and angularly under the second magnet and the first magnet, to create the strong magnetic field; and
the N and S poles of the rotor magnets are angularly aligned to create magnetic field lines passing angularly through a first rotor magnet and both under the first rotor magnet, and over the first rotor magnet and through a first pole piece residing over the first rotor magnet, to create the weak magnetic field.

3. The rotor and stator assembly of claim 1, wherein:
the pole pieces are in a flux squeeze configuration;
the rotor magnets reside angularly between the pole pieces;
the N and S poles of the rotor magnets are angularly aligned to create magnetic field lines passing angularly through a first rotor magnet, though a first pole piece to the left of the first rotor magnet curving outward and reaching angularly over the first pole piece to a second pole piece, curving inward and through the second pole piece on an opposite side of the first rotor magnet, and back angularly through the first rotor magnet to create the strong magnetic field; and
the N and S poles of the rotor magnets are radially aligned to create magnetic field lines passing radially through a first rotor magnet and looping through first and second pole pieces residing on opposite sides of the first rotor magnet, to create the weak magnetic field.

4. The rotor and stator assembly of claim 1, further including magnet gears attached to ends of each of the rotatable permanent magnets cooperating to maintain approximately the same alignment of each of the rotatable permanent magnets.

5. The rotor and stator assembly of claim 4, wherein sliding toothed racks cooperate with adjacent ones of the rotatable permanent magnets to maintain approximately the same alignment of each of the rotatable permanent magnets.

6. The rotor and stator assembly of claim 5, wherein a straight lever connects to at least one of the toothed racks and the lever is actuated to slide the toothed racks to adjust the alignment of each of the rotatable permanent magnets.

7. The rotor and stator assembly of claim 6, wherein the straight lever is actuated by a linear actuator to slide the toothed racks to adjust the alignment of each of the rotatable permanent magnets.

8. The rotor and stator assembly of claim 7, wherein the linear actuator is a stepper motor.

9. The rotor and stator assembly of claim 5, wherein a split lever connects to at least one of the toothed racks and the split lever is actuated to slide the toothed racks to adjust the alignment of each of the rotatable permanent magnets.

10. The rotor of claim 9, wherein a peak of the split lever resides against a sliding piece and translation of the sliding piece towards the split lever spreads the split lever to adjust the alignment of each of the rotatable permanent magnets.

11. The rotor and stator assembly of claim 10, wherein the split lever is actuated by a linear actuator to slide the toothed racks to adjust the alignment of each of the rotatable permanent magnets.

12. The rotor and stator assembly of claim 5, wherein a hydraulic piston is actuated to slide the toothed racks to adjust the alignment of each of the rotatable permanent magnets.

13. The rotor and stator assembly claim 12, wherein the hydraulic piston is in fluid communication with a second hydraulic piston and actuation of the second hydraulic piston causes translation of the hydraulic piston and caused the toothed racks to adjust the alignment of each of the rotatable permanent magnets.

14. The rotor and stator assembly of claim 13, wherein the second hydraulic piston is actuated by a linear actuator.

15. The rotor and stator assembly of claim 4, wherein a single center gear cooperates with each of the magnet gears to maintain approximately the same alignment of each of the rotatable permanent magnets.

16. The rotor and stator assembly of claim 1, further including fixed external rotor magnets attached to the outside of the rotor.

17. An electric motor comprising:
a stator having electrical stator windings;
a rotating stator magnetic field created by electrical current running through the stator windings;
a rotor residing inside the stator windings, the rotors comprising:
fixed axially extending pole pieces made from magnetically conducting non-magnetizable material; and
internal axially extending rotatable permanent rotor magnets having axially extending north (N) and south (S) poles, the rotor magnets residing in an alignment to the pole pieces selected from radially aligned under the pole pieces and angularly aligned between the pole pieces, the rotor magnets rotatable to face the N and S poles towards the pole pieces to create a strong magnetic field and to rotate the rotor magnets to face the N and S poles away from the pole pieces to create a weak magnetic field.

18. An electric generator comprising:
a stator having electrical stator windings;
a rotatable rotor residing inside the stator windings, the rotors comprising:
fixed pole pieces reaching axially in the rotor made from magnetically conducting non-magnetizable material; and
internal axially extending rotatable permanent rotor magnets having axially extending north (N) and south (S) poles, the rotor magnets residing in an alignment to the pole pieces selected from radially aligned under the pole pieces and angularly aligned between the pole pieces, the rotor magnets rotatable to face the N and S poles towards the pole pieces to create a strong magnetic field and to rotate the rotor magnets to face the N and S poles away from the pole pieces to create a weak magnetic field;
rotating mechanical apparatus connected to the rotor to rotate the rotor inside the stator; and
electrical current created in the stator windings by the rotating rotor magnetic field.

19. The rotor and stator assembly of claim 1, wherein the rotor comprises a single rotor cooperating with the stator and the rotatable rotor magnets extend the length of the rotor.

20. The rotor and stator assembly of claim 18, wherein the rotor comprises a single rotor cooperating with the stator and the rotatable rotor magnets extend the length of the rotor.

\* \* \* \* \*